US011074157B2

(12) United States Patent
Meng et al.

(10) Patent No.: US 11,074,157 B2
(45) Date of Patent: Jul. 27, 2021

(54) SPLICING SCREEN DEBUGGING METHOD, SPLICING SCREEN AND SPLICING WALL

(71) Applicants: Beijing BOE Display Technology Co., Ltd., Beijing (CN); BOE Technology Group Co., Ltd., Beijing (CN)

(72) Inventors: Zhiming Meng, Beijing (CN); Jianting Wang, Beijing (CN); Rui Guo, Beijing (CN); Jianzi He, Beijing (CN); Junning Su, Beijing (CN); Xiaokang Hou, Beijing (CN); Zhaohong Fu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/940,605

(22) Filed: Jul. 28, 2020

(65) Prior Publication Data
US 2021/0056010 A1    Feb. 25, 2021

(30) Foreign Application Priority Data

Aug. 21, 2019    (CN) .......................... 201910775174.8

(51) Int. Cl.
*G06F 11/36*    (2006.01)
*G06F 3/14*    (2006.01)

(52) U.S. Cl.
CPC ........ *G06F 11/3664* (2013.01); *G06F 3/1446* (2013.01); *G06F 11/3656* (2013.01)

(58) Field of Classification Search
None
See application file for complete search history.

(56) References Cited

U.S. PATENT DOCUMENTS

| | | | |
|---|---|---|---|
| 10,334,243 B2* | 6/2019 | Wang | ..................... H04N 17/04 |
| 10,657,859 B2* | 5/2020 | Wang | ..................... G06T 3/4038 |
| 2011/0307741 A1* | 12/2011 | Chen | ..................... G06F 11/3648 |
| | | | 714/38.1 |
| 2017/0115344 A1* | 4/2017 | Kuehnis | ........... G01R 31/31723 |

(Continued)

Primary Examiner — Philip Wang
Assistant Examiner — Rongfa P Wang
(74) Attorney, Agent, or Firm — Westman, Champlin & Koehler, P.A.

(57) ABSTRACT

Embodiments of the present disclosure provide a splicing screen debugging method, a splicing screen and a splicing wall. The splicing screen debugging method includes: receiving, by the currently-debugged splicing screen, at least two debugging commands sent by the debugging equipment in a wireless broadcast way, each of the at least two debugging commands being adapted to debug one splicing screen of the at least two splicing screens; selecting, by the currently-debugged splicing screen, a target debugging command from the at least two debugging commands; reading, by the currently-debugged splicing screen, location identification information in the target debugging command; reading, by the currently-debugged splicing screen, debugging parameters in the target debugging command in response to the location identification information matching local location information pre-stored in the currently debugging splicing screen; and debugging the currently-debugged splicing screen according to the debugging parameters.

16 Claims, 4 Drawing Sheets

(56) References Cited

U.S. PATENT DOCUMENTS

| | | | |
|---|---|---|---|
| 2018/0365130 A1* | 12/2018 | Hintsala | G06F 11/3664 |
| 2019/0026061 A1* | 1/2019 | Wang | G09G 5/006 |
| 2020/0117564 A1* | 4/2020 | Wu | G06F 11/2736 |
| 2020/0174662 A1* | 6/2020 | Liang | G06F 1/1649 |
| 2020/0210301 A1* | 7/2020 | Nandan | G06F 11/2242 |
| 2020/0271977 A1* | 8/2020 | Chen | G02F 1/1345 |
| 2020/0312820 A1* | 10/2020 | Liu | H01L 25/0753 |
| 2021/0010631 A1* | 1/2021 | Wang | G01G 5/06 |
| 2021/0056010 A1* | 2/2021 | Meng | G06F 3/1446 |

* cited by examiner

SPLICING SCREEN DEBUGGING METHOD, SPLICING SCREEN AND SPLICING WALL

CROSS-REFERENCE TO RELATED APPLICATION

This application claims priority of Chinese Patent Application No. 201910775174.8 filed on Aug. 21, 2019 in China National Intellectual Property Administration, the disclosure of which is incorporated herein by reference in entirety.

TECHNICAL FIELD

Embodiments of the present disclosure relate to the field of display technology, and in particular, to a splicing screen debugging method, a splicing screen and a splicing wall.

BACKGROUND

With the rapid development of display technology, there are more and more types of display screens, and different types of display screens can meet the display requirements in different scenarios. For example, when it is required to display the video content of the whole screen and multiple independent screens, it can be displayed through the splicing wall. The splicing wall may include at least two splicing screens, and each splicing screen can be individually controlled for display, thereby displaying an image independently. Therefore, in practical applications, when an entire image needs to be displayed, each splicing screen can display a part of it, and then the entire image may be combined, and when multiple independent images need to be displayed, each splicing screen can display a separate image.

Each splicing screen needs to be debugged before normal use to ensure its display effect. Generally, each splicing screen needs to be controlled independently, therefore, each splicing screen needs to be individually connected to a debugging equipment through a signal line during debugging. After one splicing screen is debugged, the debugging equipment is then connected to the next splicing screen for debugging.

SUMMARY

In an embodiment of the present disclosure, there is provided a splicing screen debugging method, executed by a currently-debugged splicing screen, wherein the currently-debugged splicing screen is connected to at least two splicing screens, and the at least two splicing screens are wirelessly connected to a debugging equipment, the method comprising:

receiving, by the currently-debugged splicing screen, at least two debugging commands sent by the debugging equipment in a wireless broadcast way, each of the at least two debugging commands being adapted to debug one splicing screen of the at least two splicing screens;

selecting, by the currently-debugged splicing screen, a target debugging command from the at least two debugging commands;

reading, by the currently-debugged splicing screen, location identification information in the target debugging command;

reading, by the currently-debugged splicing screen, debugging parameters in the target debugging command in response to the location identification information matching local location information pre-stored in the currently debugging splicing screen; and debugging the currently-debugged splicing screen according to the debugging parameters.

According to some embodiments of the present disclosure, debugging the currently-debugged splicing screen according to the debugging parameters, comprises:

setting the debugging parameters as screen display parameters of the currently-debugged splicing screen;

reading a test screen display data in the target debugging command; and displaying the test screen display data according to the screen display parameters, to complete debugging;

wherein, the debugging parameters include at least one of a color temperature value, a brightness value, a contrast value, a saturation value or a white balance value.

According to some embodiments of the present disclosure, prior to receiving, by the currently-debugged splicing screen, at least two debugging commands sent by the debugging equipment in a wireless broadcast way, the method further comprises:

sending the local location information of the currently-debugged splicing screen to the debugging equipment in a wireless response way, so that the debugging equipment generates the debugging command according to the local location information.

According to some embodiments of the present disclosure, after reading, by the currently-debugged splicing screen, location identification information in the target debugging command, the method further comprises:

deleting the target debugging command in response that the location identification information does not match the local location information pre-stored in the currently-debugged splicing screen; and selecting one debugging command from the rest of the debugging commands as the target debugging command, and returning to the step of reading, by the currently-debugged splicing screen, the location identification information in the target debugging command.

According to some embodiments of the present disclosure, the step of selecting, by the currently-debugged splicing screen, a target debugging command from the at least two debugging commands, comprises:

selecting one debugging command with earliest receiving time as the target debugging command according to receiving time of each debugging command; or selecting randomly one debugging command as the target debugging command.

According to some embodiments of the present disclosure, the step of selecting one debugging command from the rest of the debugging commands as the target debugging command, comprises:

selecting one debugging command with earliest receiving time from the rest of the debugging commands as the target debugging command; or selecting randomly one debugging command from the rest of the debugging commands as the target debugging command.

According to some embodiments of the present disclosure, two splicing screens are debugged simultaneously; or
two splicing screens are debugged sequentially.

According to some embodiments of the present disclosure, prior to sending the local location information of the currently-debugged splicing screen to the debugging equipment in a wireless response way, the method further comprises:

burning the local location information in each splicing screen; or setting the local location information for each splicing screen through a dial switch of the splicing screen.

According to some embodiments of the present disclosure, each of the at least two debugging commands comprises: a splicing screen identification start code, a row number of the splicing screen, a column number of the splicing screen, a parameter debugging start position code, the debugging parameters, a parameter debugging end position code, a test screen display data start code, a test screen display data, and a splicing screen identification end code.

In another embodiment of the present disclosure, there is provided a splicing screen provided with a processor, wherein when executing a program stored in a memory, the processor realizes the following functions of:

receiving, by a receiving device, at least two debugging commands sent by a debugging equipment in a wireless broadcast way;

selecting, by a selecting device, a target debugging command from the at least two debugging commands;

reading, by a first reading device, location identification information in the target debugging command;

reading, by a second reading device, debugging parameters in the target debugging command in response to the location identification information matching local location information pre-stored in a currently debugging splicing screen; and debugging, by a debugging device, the currently-debugged splicing screen according to the debugging parameters.

According to some embodiments of the present disclosure, the debugging device comprises:

a setting sub-device configured for setting the debugging parameters as screen display parameters of the currently-debugged splicing screen;

a reading sub-device configured for reading a test screen display data in the target debugging command;

a displaying sub-device configured for displaying the test screen display data according to the screen display parameters, to complete debugging;

wherein, the debugging parameters comprise at least one of a color temperature value, a brightness value, a contrast value, a saturation value or a white balance value.

According to some embodiments of the present disclosure, the splicing screen further comprises:

a sending device configured for sending the local location information of the currently-debugged splicing screen to the debugging equipment in a wireless response way, so that the debugging equipment generates the debugging command according to the local location information.

According to some embodiments of the present disclosure, the splicing screen further comprises:

a deleting device configured for deleting the target debugging command in response that the location identification information does not match the local location information pre-stored in the currently-debugged splicing screen; and a calling device configured for selecting one debugging command from the rest of the debugging commands as the target debugging command, and then calling the first reading device to read the location identification information in the target debugging command.

In a further embodiment of the present disclosure, there is provided a splicing wall comprising at least two splicing screens according to any one of the above embodiments.

In a still another embodiment of the present disclosure, there is provided a computer-readable storage medium stored with a computer program, wherein the computer program is executed by a processor to implement the splicing screen debugging method according to any one of the above embodiments.

In a still further embodiment of the present disclosure, there is provided a processor execution method, executing the splicing screen debugging method according to any one of the above embodiments.

DETAILED DESCRIPTION OF EMBODIMENTS

In order to make the above objects, features and advantages of the present disclosure more obvious and understandable, the present disclosure will be further described in detail in conjunction with the accompanying drawings and specific embodiments.

The existing debugging method needs to configure a large number of signal lines for the splicing wall. Especially, for a super large splicing wall project, there are many wirings and the wiring arrangement is different, and the debugging process is also cumbersome. In addition, this debugging method has a certain degree of customization. If there is a problem during the subsequent use of the splicing screen, it cannot be debugged in time. It needs to be sent back to the manufacturer for repair or replacement, thereby the operation and maintenance cycle is long and the flexibility of debugging is relatively low.

Embodiments of the present disclosure provide a splicing screen debugging method, a splicing screen, and a splicing wall, to at least partially solve the problems in existing splicing screen debugging methods, such as multiple wirings, difficult wiring arrangement, cumbersome debugging process, long operation and maintenance cycle, and relatively low flexibility of debugging.

Figure 1:
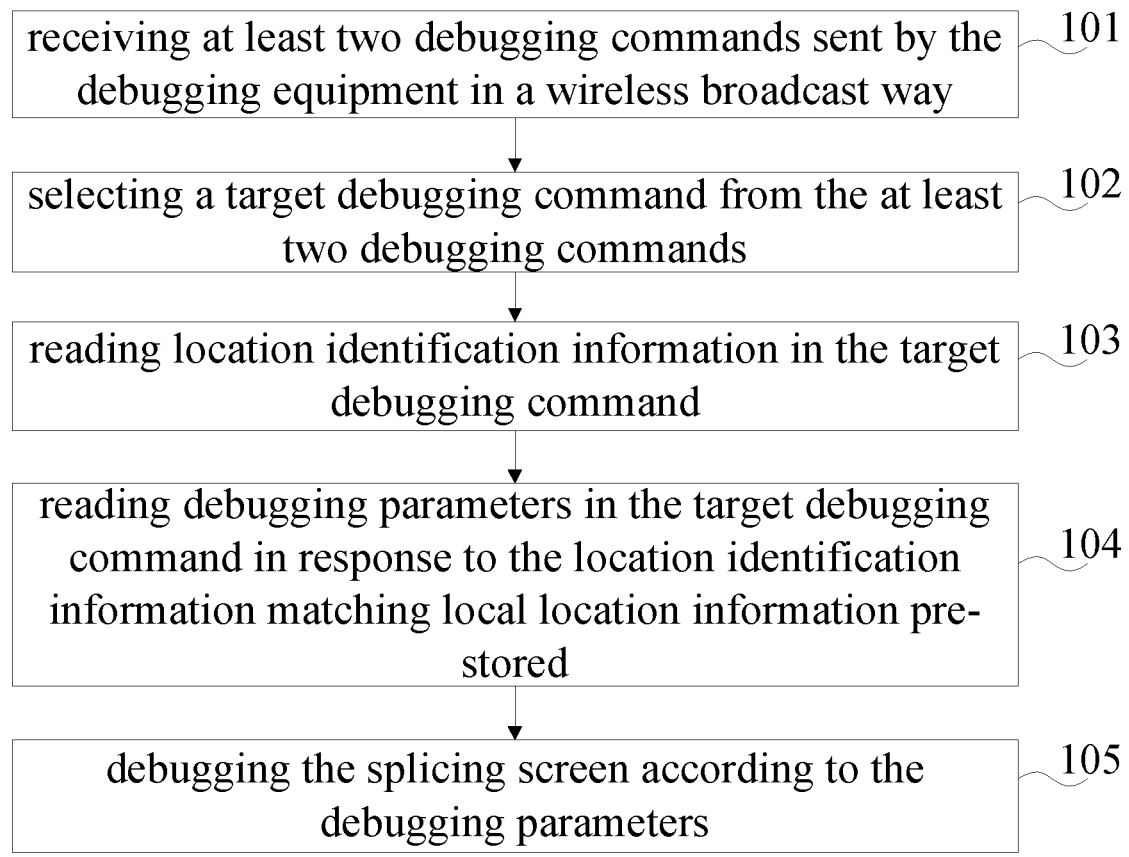
FIG. 1 shows a flowchart of a splicing screen debugging method according to an embodiment of the present disclosure.

Referring to FIG. 1, a flowchart of a splicing screen debugging method according to an embodiment of the present disclosure is shown. The method is applied to a splicing screen, and the splicing screen is wirelessly connected to a debugging equipment. The method may include the following steps.

Step 101 is of receiving at least two debugging commands sent by the debugging equipment in a wireless broadcast way.

In the embodiment of the present disclosure, the splicing wall may include at least two splicing screens, and each splicing screen may be configured with a wireless module, and the wireless module may be configured to receive data and send data in a wireless manner. The debugging equipment may be a desktop computer, a mobile terminal, etc., installed with a splicing screen debugging software and having wireless functions, and the splicing screen debugging software may be used to at least send a debugging command to each splicing screen in a wireless broadcast way.

Specifically, each splicing screen corresponds to a piece of local location information, and each piece of local location information can indicate the position or order of the splicing screen in all splicing screens. For example, for a splicing wall with 6 rows and 9 columns, the local location information corresponding to the splicing screen located in the third row and fourth column can be (3, 4). Debugging equipment can generate debugging command corresponding to each splicing screen according to the local location information of each splicing screen, and then debugging equipment can send all debugging commands to each splicing screen in a wireless broadcast way. Since each debugging command is sent in a wireless broadcast way, each splicing screen will receive the debugging commands indiscriminately, that is, each splicing screen can receive the debugging commands of all splicing screens.

Step 102 is of selecting a target debugging command from the at least two debugging commands.

In this step, for any splicing screen in the splicing wall, when the splicing screen receives the debugging commands of all splicing screens, one of them can be selected as the target debugging command. For example, the splicing screen can select the debugging command with the earliest receiving time as the target debugging command according to the receiving time of each debugging command. Of course, the splicing screen can also randomly select a debugging command as the target debugging command, and the embodiments of the present disclosure does not specifically limit the selection rule of the target debugging command.

Step 103 is of reading location identification information in the target debugging command.

In the embodiment of the present disclosure, after the target debugging command is selected, the splicing screen can read the location identification information in the target debugging command to determine whether the target debugging command is the debugging command corresponding to the splicing screen.

Step 104 is of reading debugging parameters in the target debugging command in response to the location identification information matching local location information pre-stored.

In the embodiment of the present disclosure, the splicing screen can compare the location identification information in the target debugging command with the local location information pre-stored in the splicing screen. If the two are consistent, it can be determined that the location identification information matches the pre-stored local location information, that is, it can be determined that the target debugging command is the debugging command corresponding to the splicing screen. Then the splicing screen can further read the debugging parameters in the target debugging command.

Step 105 is of debugging the splicing screen according to the debugging parameters.

In the embodiment of the present disclosure, the splicing screen can set the debugging parameters as its own screen display parameters, and then can subsequently display at least one test screen according to the screen display parameters. If all test screens are displayed without errors, the debugging is successful, and the debugging of the splicing screen is completed. Each splicing screen in the splicing wall can be debugged according to the above steps, and if each splicing screen is successfully debugged, then the debugging of the splicing wall is completed.

In the embodiments of the present disclosure, the splicing screen can first receive at least two debugging commands sent by the debugging equipment in a wireless broadcast way, and then can select the target debugging command from at least two debugging commands and read the location identification information in the target debugging command. When the location identification information matches the pre-stored local location information, it means that the target debugging command is the debugging command for debugging the splicing screen, and then the splicing screen can read the debugging parameters in the target debugging command, and implement the debugging according to debugging parameters. Firstly, the splicing screen can receive debugging commands wirelessly for debugging, which can reduce the amount of wiring of the splicing screen and reduce the difficulty of wiring. Secondly, each splicing screen can find the corresponding debugging command from at least two debugging commands according to the location identification information in the debugging command, so that they can be debugged individually other than debugged in sequence, so the debugging process can be simplified. In addition, the splicing screen can wirelessly receive debugging commands sent by debugging equipment for debugging. This method is simple and easy, and there is no need to disassemble the splicing screen, and there is no need to send it back to the manufacturer for repair or replacement. This shortens the operation and maintenance cycle, while improving the flexibility of debugging the splicing screen.

Figure 2:
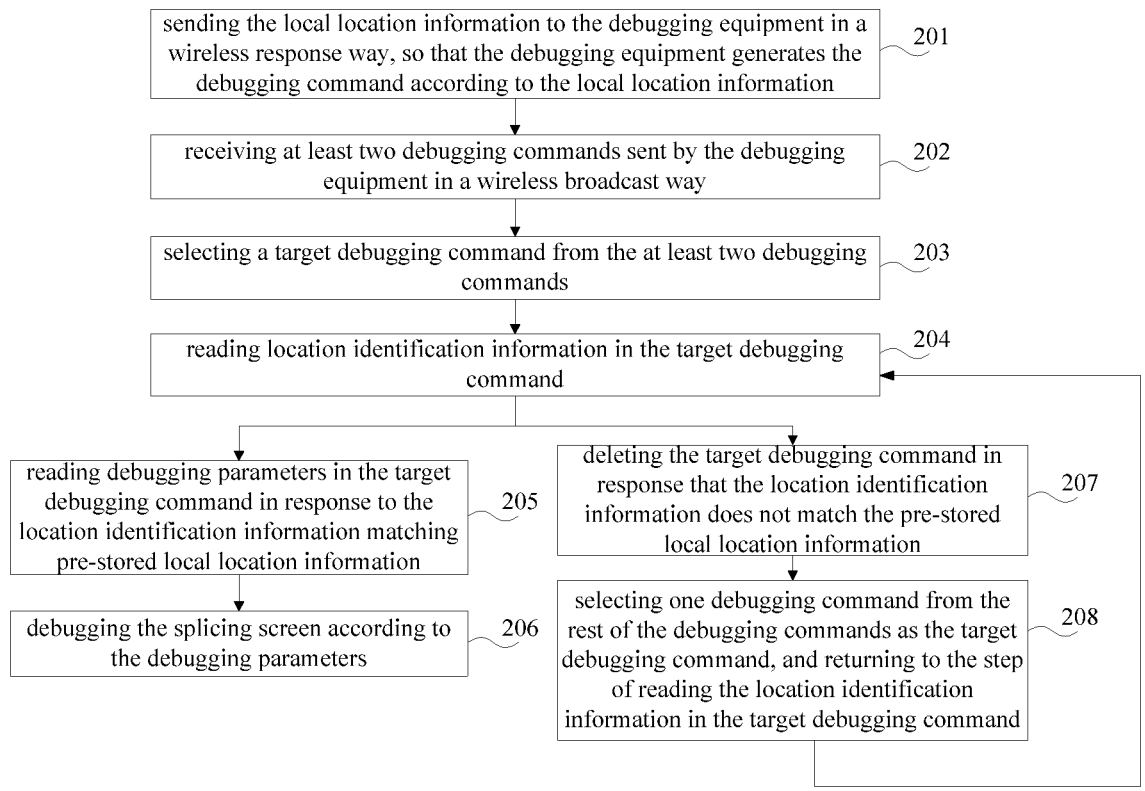
FIG. 2 shows a flowchart of a splicing screen debugging method according to an embodiment of the present disclosure.

Referring to FIG. 2, a flowchart of a splicing screen debugging method according to an embodiment of the present disclosure is shown. The method is applied to a splicing screen, and the splicing screen is wirelessly connected to a debugging equipment. The method may include the following steps.

Step 201 is of sending the local location information to the debugging equipment in a wireless response way, so that the debugging equipment generates the debugging command according to the local location information.

In the embodiment of the present disclosure, the local location information of each splicing screen may be pre-stored in the splicing screen to which it belongs. In an optional implementation, for any splicing screen, the corresponding local location information can be burned in the splicing screen before assembly. In another optional implementation, a dial switch can be provided for each splicing screen correspondingly, so that for any splicing screen, the local location information can be set for the splicing screen before assembly by using the dial switch corresponding to the splicing screen. Among them, the dial switch is equivalent to an assembly including multiple switches, each switch can be dialed to the on state or the off state, the on state can be expressed as 1, and the off state can be expressed as 0, thus the local location information corresponding to the splicing screen can be represented by a binary code, such as 00110011, 01011000, 01000101, etc., where part of the binary code can represent the row where the splicing screen is located, and the other part can represent the column where the splicing screen is located. There are no specific limitations on this in the embodiments of the present disclosure.

When the splicing screen needs to be debugged, the debugging equipment can send a local location information acquisition request to each splicing screen in a wireless broadcast way. When the splicing screen receives it, the splicing screen can send its local location information in a wireless response way to the debugging equipment. After receiving the local location information, the debugging equipment can generate corresponding debugging commands according to respective local location information. Specifically, for any local location information, the debugging equipment can write the local location information to the corresponding byte in a debugging command, and write the debugging parameters and other information for the splicing screen to which the local location information belongs to the corresponding byte, to get the debugging command for the splicing screen to which the local location information belongs.

The splicing screen sends local location information to the debugging equipment in a wireless response way, so that the debugging equipment can generate the corresponding debugging command according to the local location information. In this way, the splicing screen can be debugged through any debugging equipment, which further improves the flexibility of debugging.

Exemplarily, the following Table 1 shows a data structure of a debugging command Referring to Table 1, the first byte can be written in with a splicing screen identification start code as the starting identifier for reading the debugging command. For any splicing screen, the second byte can be written in with a row number of the splicing screen in the splicing wall, the third byte can be written in with the column number of the splicing screen in the splicing wall, the second byte and the third byte may represent the local location information of the splicing screen. The fourth byte can be written in with a debugging start position code as the starting identifier of the debugging process. Debugging parameters can be written in the 5th byte to the 11th byte. The 12th byte can be written in with a debugging end position code, which can indicate that the debugging parameters have been read. The 13th byte can be written in with a test screen display data start code as the starting identifier for reading the test screen display data. Test screen display data can be written in the 14th byte to the 299th byte, which is used to test the image of the splicing screen. The 15th byte can be written in with a splicing screen identification end code as the identifier of ending the command reading.

TABLE 1

| Number of byte | meanings of the byte |
| --- | --- |
| 1 | splicing screen identification start code |
| 2 | row number of the splicing screen |
| 3 | column number of the splicing screen |
| 4 | parameter debugging start position code |
| 5 | color temperature R value adjustment |
| 6 | color temperature G value adjustment |
| 7 | color temperature B value adjustment |
| 8 | brightness value |
| 9 | contrast value |
| 10 | saturation value |
| 11 | white balance value |
| 12 | parameter debugging end position code |
| 13 | test screen display data start code |
| 14-299 | test screen display data |
| 300 | splicing screen identification end code |

It should be noted that the embodiment of the present disclosure only uses the debugging command data structure shown in Table 1 as an example for description. In actual applications, the debugging command data structure may also be in other forms, and the bytes occupied by various types of data may also be different from that shown in Table 1. The debugging command data structure shown in Table 1 above does not limit the present disclosure.

Step 202 is of receiving at least two debugging commands sent by the debugging equipment in a wireless broadcast way.

This step is similar to the implementation process of step 101 above, and will not be repeated here.

Step 203 is of selecting a target debugging command from the at least two debugging commands.

This step is similar to the implementation process of step 102 above, and will not be repeated here.

Step 204 is of reading location identification information in the target debugging command.

In this step, taking the data structure of the debugging command shown in Table 1 as an example, after selecting the target debugging command, the splicing screen can first read the first byte in the target debugging command, the 1st byte is the splicing screen identification start code, indicating that the location identification information can be read, and then the 2nd and 3rd bytes can be read. When the 4th byte is read, it can be determined that the location identification information has been read, thus the splicing screen can obtain the location identification information in the target debugging command to determine whether the target debugging command is the debugging command corresponding to the splicing screen.

Step 205 is of reading debugging parameters in the target debugging command in response to the location identification information matching pre-stored local location information.

In the embodiment of the present disclosure, the splicing screen can compare the location identification information in the target debugging command with its pre-stored local location information, if the location identification information that comes from the combination of the 2nd byte and the 3rd byte in the target debugging command is consistent with the local location information pre-stored in the splicing screen, it can be determined that the location identification information matches the pre-stored local location information, that is, the target debugging command can be determined as the debugging command corresponding to the splicing screen. The splicing screen can then read the 4th byte in the target debugging command, the 4th byte is the parameter debugging start position code, indicating that the debugging process starts, namely it starts to obtain debugging parameters, and then the debugging parameters in the subsequent bytes can be read until the parameter debugging end position code is read, that is, the 12th byte, indicating that the debugging parameters have been read.

Step 206 is of debugging the splicing screen according to the debugging parameters.

In the embodiment of the present disclosure, this step may be implemented in the following ways, including: setting the debugging parameters as the screen display parameters of the splicing screen; reading the test screen display data in the target debugging command; displaying, according to the screen display parameters, the test screen display data to complete debugging. The debugging parameters include at least one of color temperature value, brightness value, contrast value, saturation value or white balance value. The color temperature value may specifically include a color temperature R value, a color temperature G value, and a color temperature B value. By adjusting these three components, the splicing screen can achieve a specific color temperature when displaying the image.

Specifically, after the splicing screen obtains the debugging parameters between the parameter debugging start position code and the parameter debugging end position code in the target debugging command, the debugging parameters can be set as its own screen display parameters, that is, the splicing screen can adjust its own screen display parameters according to the debugging parameters. Further-more, the splicing screen can continue to read the 13th byte in the target debugging command. The 13th byte is the test screen display data start code, indicating that it can start to test screen display data. Then, the splicing screen can continue to read the test screen display data in the subsequent bytes until the splicing screen identification end code is read, that is, the 300th byte, indicating that the test screen display data has been read. Then, giant splicing screen can display the read test screen display data according to the set screen display parameters, so that at least one test screen can be displayed. If all test screens are displayed without errors, the debugging is successful, and the debugging of the splicing screen is completed. If there is an abnormal display on the test screen, the debugging is continued until the debugging is successful. Each splicing screen in the splicing wall can be debugged according to the above steps, until each splicing screen is successfully debugged, then, the debugging of the splicing wall is completed.

Step 207 is of deleting the target debugging command in response that the location identification information does not match the pre-stored local location information.

In the embodiment of the present disclosure, the splicing screen can compare the location identification information in the target debugging command with its pre-stored local location information, if the location identification information combined by the 2nd byte and the 3rd byte in the target debugging command is inconsistent with the local location information pre-stored in the splicing screen, it can be determined that the location identification information does not match the pre-stored local location information, that is, it can be determined that the target debugging command is not the debugging command corresponding to the splicing screen. Thus, the splicing screen can delete the target debugging command.

Step 208 is of selecting one debugging command from the rest of the debugging commands as the target debugging command, and returning to the step of reading the location identification information in the target debugging command.

In this step, after deleting the current target debugging command, the splicing screen can select a debugging command from the rest of the received debugging commands as the target debugging command. For example, the splicing screen can select the debugging command with the earliest receiving time as the target debugging command according to the receiving time of the remaining debugging commands. Of course, the splicing screen can also randomly select one of the remaining debugging commands as the target debugging command, which is not specifically limited in the embodiments of the present disclosure. Then, based on the newly selected target debugging command, the splicing screen can return to the step 204 until the debugging command corresponding to itself is found from all the debugging commands received, and then the debugging is completed, then the operation is ended.

In the embodiments of the present disclosure, the splicing screen can first send the local location information to the debugging equipment in a wireless response way, so that the debugging equipment generates a debugging command according to the local location information, and then can receive at least two debugging commands sent by the debugging equipment in a wireless broadcast way, then can select the target debugging command from the at least two debugging commands, and read the location identification information in target debugging command. When the location identification information matches the pre-stored local location information, it indicates that the target debugging command is a debugging command for debugging the splicing screen, and then the splicing screen can read the debugging parameters in the target debugging command and proceed the debugging according to the debugging parameters. When the location identification information does not match the pre-stored local location information, it means that the target debugging command is not a debugging command for debugging the splicing screen, and then the splicing screen can delete the target debugging command, and then select a debugging command from the rest of the debugging commands as the target debugging command, and return to the step of reading the location identification information in the target debugging command until it finds the corresponding debugging command from all the received debugging commands and then the debugging is completed, then the operation is ended. In the embodiments of the present disclosure, firstly, the splicing screen can receive debugging commands wirelessly for debugging, which can reduce the amount of wiring of the splicing screen and reduce the difficulty of wiring, and also save wiring costs and reduce wiring space. Secondly, each splicing screen can find the corresponding debugging command from at least two debugging commands according to the location identification information in the debugging command, so that they can be debugged individually other than debugged in sequence, so the debugging process can be simplified. In addition, the splicing screen can wirelessly receive debugging commands sent by debugging equipment for debugging. This method is simple and easy, and there is no need to disassemble the splicing screen, and there is no need to send it back to the manufacturer for repair or replacement. This shortens the operation and maintenance cycle, while improving the flexibility of debugging the splicing screen.

Figure 3:
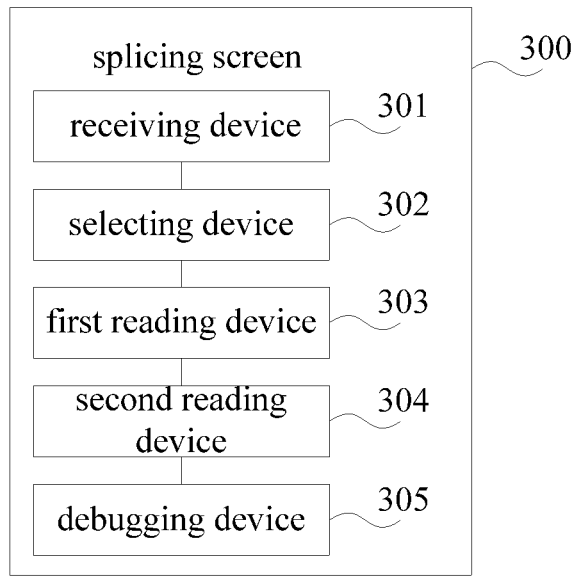
FIG. 3 shows a structural block diagram of a splicing screen according to an embodiment of the present disclosure.

FIG. 3 shows a structural block diagram of a splicing screen according to an embodiment of the present disclosure. Referring to FIG. 3, the splicing screen 300 is provided with a processor. When executing a program stored in a memory, the processor realizes the following functions of:

receiving, by a receiving device 301, at least two debugging commands sent by the debugging equipment in a wireless broadcast way;

selecting, by a selecting device 302, a target debugging command from the at least two debugging commands;

reading, by a first reading device 303, location identification information in the target debugging command;

reading, by a second reading device 304, debugging parameters in the target debugging command in response to the location identification information matching local location information pre-stored in the currently debugging splicing screen; and debugging, by a debugging device 305, the splicing screen according to the debugging parameters.

Figure 4:
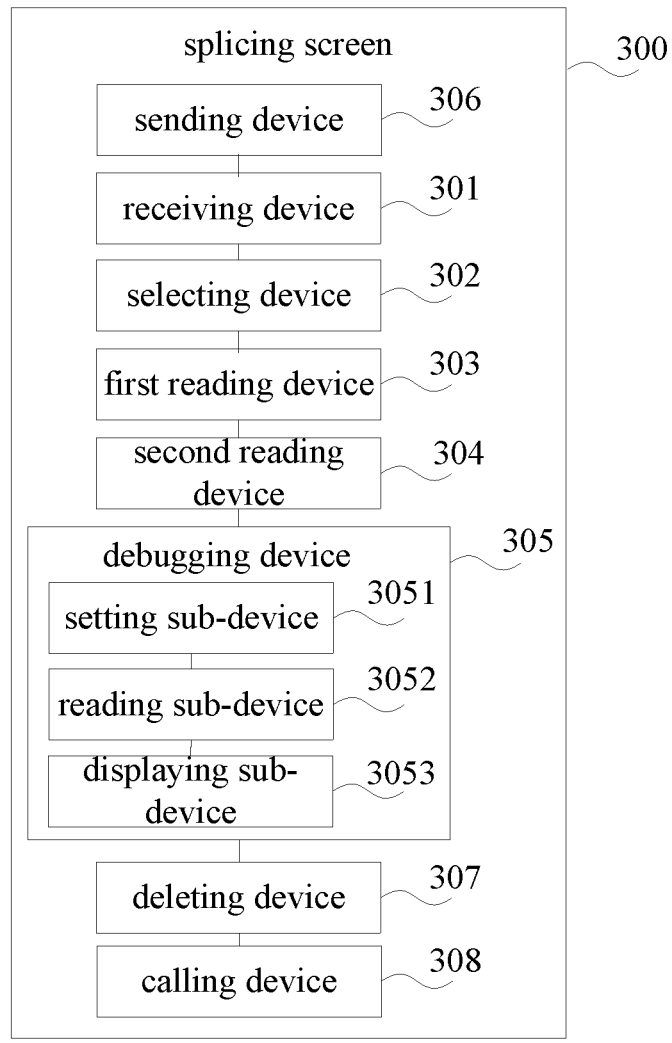
FIG. 4 shows a structural block diagram of a splicing screen according to an embodiment of the present disclosure.

According to some embodiments of the present disclosure, referring to FIG. 4, the debugging device 305 includes:

a setting sub-device 3051 configured for setting the debugging parameters as screen display parameters of the currently-debugged splicing screen;

a reading sub-device 3052 configured for reading a test screen display data in the target debugging command;

a displaying sub-device 3053 configured for displaying the test screen display data according to the screen display parameters, to complete debugging;

wherein, the debugging parameters include at least one of a color temperature value, a brightness value, a contrast value, a saturation value or a white balance value.

According to some embodiments of the present disclosure, referring to FIG. 4, the splicing screen 300 further comprises:

a sending device 306 configured for sending the local location information to the debugging equipment in a wireless response way, so that the debugging equipment generates the debugging command according to the local location information.

According to some embodiments of the present disclosure, referring to FIG. 4, the splicing screen 300 further comprises:

a deleting device 307 configured for deleting the target debugging command in response that the location identification information does not match the local location information pre-stored in the splicing screen; and a calling device 308 configured for selecting one debugging command from the rest of the debugging commands as the target debugging command, and then calling the first reading device to return to the step of reading the location identification information in the target debugging command.

In the embodiment of the present disclosure, the splicing screen can first receive at least two debugging commands sent by debugging equipment in a wireless broadcast way by the receiving device, and then can select the target debugging command from the at least two debugging commands by the selecting device, and read the location identification information in the target debugging command by the first reading device. When the location identification information matches the pre-stored local location information, it means that the target debugging command is a debugging command for debugging the splicing screen, and then the splicing screen can read the debugging parameters in the target debugging command by the second reading device, and debug the splicing screen according to the debugging parameters by the debugging device. Firstly, the splicing screen can receive debugging commands wirelessly for debugging, which can reduce the amount of wiring of the splicing screen and reduce the difficulty of wiring. Secondly, each splicing screen can find the corresponding debugging command from at least two debugging commands according to the location identification information in the debugging command, so that they can be debugged individually other than debugged in sequence, so the debugging process can be simplified. In addition, the splicing screen can wirelessly receive debugging commands sent by debugging equipment for debugging. This method is simple and easy, and there is no need to disassemble the splicing screen, and there is no need to send it back to the manufacturer for repair or replacement. This shortens the operation and maintenance cycle, while improving the flexibility of debugging the splicing screen.

An embodiment of the present disclosure also discloses a splicing wall, and the splicing wall includes at least two of the above splicing screens.

In the embodiments of the present disclosure, the splicing screen can first receive at least two debugging commands sent by the debugging equipment in a wireless broadcast way, and then can select the target debugging command from at least two debugging commands and read the location identification information in the target debugging command. When the location identification information matches the pre-stored local location information, it means that the target debugging command is the debugging command for debugging the splicing screen, and then the splicing screen can read the debugging parameters in the target debugging command, and implement the debugging according to debugging parameters. Firstly, the splicing screen can receive debugging commands wirelessly for debugging, which can reduce the amount of wiring of the splicing screen and reduce the difficulty of wiring. Secondly, each splicing screen can find the corresponding debugging command from at least two debugging commands according to the location identification information in the debugging command, so that they can be debugged individually other than debugged in sequence, so the debugging process can be simplified. In addition, the splicing screen can wirelessly receive debugging commands sent by debugging equipment for debugging. This method is simple and easy, and there is no need to disassemble the splicing screen, and there is no need to send it back to the manufacturer for repair or replacement. This shortens the operation and maintenance cycle, while improving the flexibility of debugging the splicing screen.

An embodiment of the present disclosure also discloses a computer-readable storage medium stored with a computer program. The computer program is executed by a processor to implement the above-mentioned splicing screen debugging method.

In the embodiments of the present disclosure, the splicing screen can first receive at least two debugging commands sent by the debugging equipment in a wireless broadcast way, and then can select the target debugging command from at least two debugging commands and read the location identification information in the target debugging command. When the location identification information matches the pre-stored local location information, it means that the target debugging command is the debugging command for debugging the splicing screen, and then the splicing screen can read the debugging parameters in the target debugging command, and implement the debugging according to debugging parameters. Firstly, the splicing screen can receive debugging commands wirelessly for debugging, which can reduce the amount of wiring of the splicing screen and reduce the difficulty of wiring. Secondly, each splicing screen can find the corresponding debugging command from at least two debugging commands according to the location identification information in the debugging command, so that they can be debugged individually other than debugged in sequence, so the debugging process can be simplified. In addition, the splicing screen can wirelessly receive debugging commands sent by debugging equipment for debugging. This method is simple and easy, and there is no need to disassemble the splicing screen, and there is no need to send it back to the manufacturer for repair or replacement. This shortens the operation and maintenance cycle, while improving the flexibility of debugging the splicing screen.

In practical applications, the computer-readable storage medium may be a computer-readable medium or any combination of two or more computer-readable media. The computer-readable medium may be a computer-readable signal medium or a computer-readable storage medium. The computer-readable storage medium may be, for example but not limited to, an electrical, magnetic, optical, electromagnetic, infrared, or semiconductor system, apparatus or device, or any combination of the above. More specific examples of the computer-readable storage media (non-exhaustive list) include: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this embodiment, the computer-readable storage medium may be any tangible medium that contains or stores a program, which may be used by or in combination with an instruction execution system, apparatus, or device.

The computer-readable signal medium may include a data signal that is propagated in baseband or as part of a carrier wave, in which computer-readable program codes are carried. This propagated data signal can take many forms, including but not limited to, an electromagnetic signal, an optical signal, or any suitable combination of the above. The computer-readable signal medium may also be any computer-readable medium other than a computer-readable storage medium, and the computer-readable medium may send, propagate, or transmit a program used by or in conjunction with an instruction execution system, apparatus, or device.

The program codes contained in the computer-readable medium may be transmitted by using any appropriate medium, including but not limited to, wireless, wire, optical cable, RF, etc., or any suitable combination of the above.

The computer program codes for performing the operations of the present disclosure may be written in one or more programming languages or a combination thereof. The programming languages include object-oriented programming languages such as Java, Smalltalk, C++, as well as conventional procedural programming languages such as "C" language or similar programming language. The program codes may be entirely executed on the user's computer, partly executed on the user's computer, executed as an independent software package, partly executed on the user's computer and partly executed on a remote computer, or entirely executed on a remote computer or server. In the situations involving a remote computer, the remote computer may be connected to the user's computer through any kind of network, including a local area network (LAN) or a wide area network (WAN), or may be connected to an external computer (for example, connected through an internet provided by an internet service provider).

Figure 5:
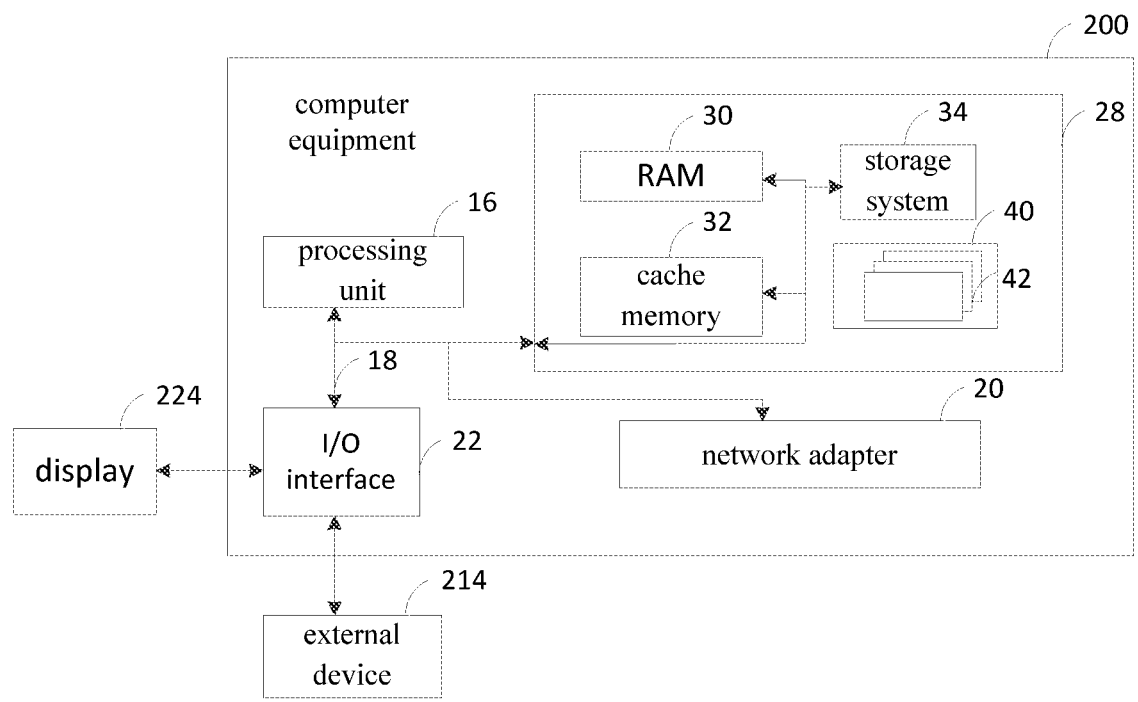
FIG. 5 shows a schematic structural diagram of a computer according to an embodiment of the present disclosure.

As shown in FIG. 5, a schematic structural view of a computer equipment according to an embodiment of the present disclosure is shown. The computer equipment 200 shown in FIG. 5 is only an example, and should not be construed as limiting the functions and application scopes of the embodiments of the present disclosure.

As shown in FIG. 5, the computer equipment 200 is represented in the form of a general-purpose computing equipment. The components of the computer equipment 200 may include, but not limited to, one or more processors or processing units 16, a system memory 28, and buses 18 connecting different system components (including the system memory 28 and the processing units 16).

The buses 18 may be one or more of several types of bus structures, including a memory bus or memory controller, a peripheral bus, a graphics acceleration port, a processor, or a local bus that uses any of a variety of bus structures. For example, these architectures include, but are not limited to, an industry standard architecture (ISA) bus, a micro channel architecture (MCA) bus, an enhanced ISA bus, a video electronics standards association (VESA) local bus, and a peripheral component interconnection (PCI) bus.

The computer equipment 200 typically includes a variety of computer system readable media. These media may be any available media that can be accessed by the computer equipment 200, including volatile and non-volatile media, removable and non-removable media.

The system memory 28 may include computer system readable media in the form of volatile memory, such as a random access memory (RAM) 30 and/or a cache memory 32. The computer equipment 200 may further include other removable/non-removable, volatile/nonvolatile computer system storage media. Merely by way of example, the storage system 34 may be used to read and write in non-removable, non-volatile magnetic media (commonly referred to as "hard drives"). Alternatively, a disk drive for reading and writing in a removable non-volatile magnetic disk (for example, a "floppy disk"), and an optical drive for reading and writing in a removable non-volatile optical disk (for example, a CD-ROM, a DVD-ROM, or any other optical media) may be provided. In these cases, each drive may be connected to the bus 18 via one or more data media interfaces. The memory 28 may include at least one program product having a set of (for example, at least one) program modules configured to perform the functions of various embodiments of the present disclosure.

A program/utility tool 40 having a set of (at least one) program modules 42 may be stored in, for example, the memory 28. Such program modules 42 include but are not limited to operating systems, one or more application programs, other program modules and program data. Each of these examples or some combination may include the implementation of a network environment. The program module 42 generally performs the functions and/or methods in the embodiments described in the present disclosure.

The computer equipment 200 may also communicate with one or more external devices 214 (for example, keyboard, pointing device, display 224, etc.), and may also communicate with one or more devices that enable a user to interact with the computer equipment 200, and/or communicate with any devices (for example, a network card, modem, etc.) that enable the computer equipment 200 to communicate with one or more other computing devices. This communication may be performed through an input/output (I/O) interface 22. Moreover, the computer equipment 200 may also communicate with one or more networks (for example, a local area network (LAN), a wide area network (WAN)), and/or a public network (for example, the Internet) through a network adapter 20. As shown in FIG. 5, the network adapter 20 communicates with other modules of the computer equipment 200 through the buses 18. It should be understood that other hardware and/or software modules may be used in conjunction with the computer equipment 200, they may include, but not limited to, microcode, device driver, redundancy processing unit, external magnetic disk drive array, RAID system, tape drive, data backup storage system and the like.

The processor unit 16 executes various functional applications and data processing by running programs stored in the system memory 28, for example, to implement the splicing screen debugging method provided by the embodiments of the present disclosure.

In the embodiments of the present disclosure, the term "controller" may be implemented by one or more logical operation processing circuits, and the logical operation processing circuits may be represented as a processor, for example, they may be a Central Processing Unit (CPU), an Application Specific Integrated Circuit (ASIC), a Digital Signal Processor (DSP), a Field Programmable Gate Array (FPGA), a Single-chip Microcomputer (MCU), or the like.

For the foregoing method embodiments, for the sake of simple description, they are all expressed as a series of action combinations, but those skilled in the art should know that the present disclosure is not limited by the sequence of actions described, because according to the present disclosure, some steps can be performed in other orders or simultaneously. Secondly, those skilled in the art should also know that the embodiments described in the specification are all preferred embodiments, and the actions and modules involved are not necessarily required by the present disclosure.

The embodiments in this specification are described in a progressive manner Each embodiment focuses on the differences from other embodiments, and the same or similar parts between the embodiments may refer to each other.

Finally, it should also be noted that herein relational terms such as first and second are used only to distinguish one entity or operation from another entity or operation, and do not necessarily require or imply there is any such actual relationship or order between these entities or operations. Moreover, the terms "comprise", "include" or any other variant thereof are intended to cover non-exclusive inclusion, so that a process, method, commodity or device that includes a series of elements includes not only those elements, but also other elements not explicitly listed, or include elements inherent to such processes, methods, goods, or equipment. Without more restrictions, the element defined by the sentence "include one . . . " does not exclude that there are other identical elements in the process, method, commodity or equipment that includes the element.

The splicing screen debugging method, the splicing screen, and the splicing wall provided by the embodiments of the present disclosure are described in detail above. Specific examples are used herein to explain the principles and implementation of the present disclosure. The above embodiments are only used to help understand the method and the core idea of the present disclosure; meanwhile, for those of ordinary skill in the art, according to the ideas of the present disclosure, there will be changes in the specific embodiments and application scope. In summary, the contents of this specification should not be construed as limiting the present disclosure.

What is claimed is:

1. A splicing screen debugging method, executed by a currently-debugged splicing screen, wherein the currently-debugged splicing screen is connected to at least two splicing screens, and the at least two splicing screens are wirelessly connected to a debugging equipment, the method comprising:
receiving, by the currently-debugged splicing screen, at least two debugging commands sent by the debugging equipment in a wireless broadcast way, each of the at least two debugging commands being adapted to debug one splicing screen of the at least two splicing screens;
selecting, by the currently-debugged splicing screen, a target debugging command from the at least two debugging commands;
reading, by the currently-debugged splicing screen, location identification information in the target debugging command;
reading, by the currently-debugged splicing screen, debugging parameters in the target debugging command in response to the location identification information matching local location information pre-stored in the currently debugging splicing screen; and
debugging the currently-debugged splicing screen according to the debugging parameters.

2. The method according to claim 1, wherein debugging the currently-debugged splicing screen according to the debugging parameters, comprises:
setting the debugging parameters as screen display parameters of the currently-debugged splicing screen;
reading a test screen display data in the target debugging command; and
displaying the test screen display data according to the screen display parameters, to complete debugging;
wherein, the debugging parameters include at least one of a color temperature value, a brightness value, a contrast value, a saturation value or a white balance value.

3. The method according to claim 1, wherein prior to receiving, by the currently-debugged splicing screen, at least two debugging commands sent by the debugging equipment in a wireless broadcast way, the method further comprises:
sending the local location information of the currently-debugged splicing screen to the debugging equipment in a wireless response way, so that the debugging equipment generates the debugging command according to the local location information.

4. The method according to claim 1, wherein after reading, by the currently-debugged splicing screen, location identification information in the target debugging command, the method further comprises:
deleting the target debugging command in response that the location identification information does not match the local location information pre-stored in the currently-debugged splicing screen; and
selecting one debugging command from the rest of the debugging commands as the target debugging command, and returning to the step of reading, by the currently-debugged splicing screen, the location identification information in the target debugging command.

5. The method according to claim 1, wherein the step of selecting, by the currently-debugged splicing screen, a target debugging command from the at least two debugging commands, comprises:
selecting one debugging command with earliest receiving time as the target debugging command according to receiving time of each debugging command; or
selecting randomly one debugging command as the target debugging command.

6. The method according to claim 4, wherein the step of selecting one debugging command from the rest of the debugging commands as the target debugging command, comprises:
selecting one debugging command with earliest receiving time from the rest of the debugging commands as the target debugging command; or
selecting randomly one debugging command from the rest of the debugging commands as the target debugging command.

7. The method according to claim 1, wherein
two splicing screens are debugged simultaneously; or
two splicing screens are debugged sequentially.

8. The method according to claim 3, wherein, prior to sending the local location information of the currently-debugged splicing screen to the debugging equipment in a wireless response way, the method further comprises:
burning the local location information in each splicing screen; or
setting the local location information for each splicing screen through a dial switch of the splicing screen.

9. The method according to claim 1, wherein each of the at least two debugging commands comprises: a splicing screen identification start code, a row number of the splicing screen, a column number of the splicing screen, a parameter debugging start position code, the debugging parameters, a parameter debugging end position code, a test screen display data start code, a test screen display data, and a splicing screen identification end code.

10. A splicing screen provided with a processor, wherein when executing a program stored in a memory, the processor realizes the following functions of:
receiving, by a receiving device, at least two debugging commands sent by a debugging equipment in a wireless broadcast way;

selecting, by a selecting device, a target debugging command from the at least two debugging commands;

reading, by a first reading device, location identification information in the target debugging command;

reading, by a second reading device, debugging parameters in the target debugging command in response to the location identification information matching local location information pre-stored in a currently debugging splicing screen; and debugging, by a debugging device, the currently-debugged splicing screen according to the debugging parameters.

11. The splicing screen according to claim 10, wherein the debugging device comprises:

a setting sub-device configured for setting the debugging parameters as screen display parameters of the currently-debugged splicing screen;

a reading sub-device configured for reading a test screen display data in the target debugging command;

a displaying sub-device configured for displaying the test screen display data according to the screen display parameters, to complete debugging;

wherein, the debugging parameters comprise at least one of a color temperature value, a brightness value, a contrast value, a saturation value or a white balance value.

12. The splicing screen according to claim 10, wherein the splicing screen further comprises:

a sending device configured for sending the local location information of the currently-debugged splicing screen to the debugging equipment in a wireless response way, so that the debugging equipment generates the debugging command according to the local location information.

13. The splicing screen according to claim 10, wherein the splicing screen further comprises:

a deleting device configured for deleting the target debugging command in response that the location identification information does not match the local location information pre-stored in the currently-debugged splicing screen; and a calling device configured for selecting one debugging command from the rest of the debugging commands as the target debugging command, and then calling the first reading device to read the location identification information in the target debugging command.

14. A splicing wall comprising at least two splicing screens according to claim 10.

15. A non-transitory computer-readable storage medium stored with a computer program, wherein the computer program is executed by a processor to implement the splicing screen debugging method of claim 1.

16. A processor execution method, executing the splicing screen debugging method of claim 1.

* * * * *